United States Patent
Griffey

[11] 3,725,739
[45] Apr. 3, 1973

[54] DUAL MODE POWER SUPPLY PROTECTION CIRCUIT

[75] Inventor: Donald E. Griffey, Skokie, Ill.
[73] Assignee: Motorola, Inc., Franklin Park, Ill.
[22] Filed: Jan. 21, 1972
[21] Appl. No.: 219,707

[52] U.S. Cl..................317/16, 317/22, 317/33 SC, 317/36 TD, 330/207 P, 307/252 J
[51] Int. Cl..........................H02h 3/08, H02h 7/20
[58] Field of Search..................307/252 J, 100, 202; 330/207 P; 317/16, 22, 33 SC, 36 TD

[56] References Cited

UNITED STATES PATENTS

| | | | |
|---|---|---|---|
| 3,526,809 | 9/1970 | Obenhaus | 317/335 C |
| 3,448,394 | 6/1969 | Rheaume | 307/202 |
| 3,475,653 | 10/1969 | Odenberg | 317/16 |
| 3,373,317 | 3/1968 | Gilker | 317/22 |
| 3,643,151 | 2/1972 | Matsushima | 317/22 |
| 3,369,154 | 2/1968 | Swain | 317/335 C |
| 3,102,241 | 8/1963 | Johnstone | 330/207 P |

Primary Examiner—J. D. Miller
Assistant Examiner—Harvey Fendelman
Attorney—Vincent J. Rauner et al.

[57] ABSTRACT

An overload protection circuit for a power supply having circuitry for sensing the amount of current delivered by the supply, and for turning off the supply with a silicon controlled rectifier in the event of an overload. Timing circuitry is provided to automatically turn on the power supply a predetermined time following turn-off, and to sense the current delivered to the load to determine whether the overload still exists. If the overload has been removed, the operation of the power supply returns to normal, but if the overload persists, the power supply is turned off and a second timing circuit maintains the power supply in the off state until the supply is manually reset.

12 Claims, 1 Drawing Figure

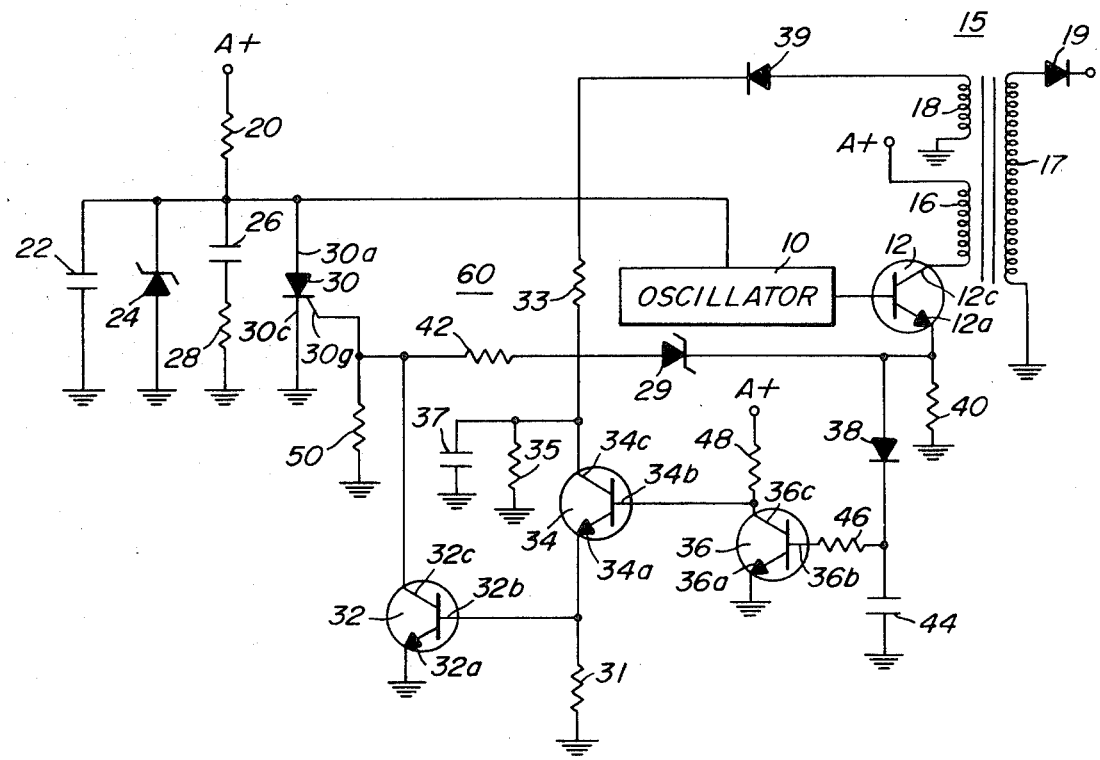

DUAL MODE POWER SUPPLY PROTECTION CIRCUIT

BACKGROUND

This invention relates generally to overload protection systems for power supplies, and more particularly to overload systems that sample the condition of the load connected to the power supply to return the power supply to normal operation after a transient overload condition has been removed.

There are many applications wherein it is desired to protect a power supply from possible damage caused by transient and continuing overloads. One such application is in a television receiver that utilizes a switching mode power supply to power the cathode ray tube and other circuits in the receiver. In such a receiver, the normal high voltage arcing which can occur at the anode, or high voltage electrode, of the cathode ray tube can draw sufficient transient current to damage the solid state power supply.

Several techniques for providing protection circuitry for solid state power supplies are known. These systems generally employ a fuse or other shut-down device, such as a silicon controlled rectifier, to turn off the power supply in the event of an overload. Other systems employ circuitry that shuts down the power supply when an overload is present, but allows the power supply to cycle between its on and off states until the overload is removed.

Whereas these techniques provide a way to protect a power supply from the effects of an overload, the first technique shuts down the power supply permanently and requires replacement of a fuse, or manual resetting of the protection circuitry to return the supply to normal operation. The second technique provides an automatic turn-on of the power supply following removal of the overload, but does not provide adequate protection to the power supply when a continuing overload is present, because continuous cycling between the on and off states of the supply can cause overheating and failure of filter capacitors and other power supply components.

SUMMARY

It is an object of the present invention to provide an improved circuit for protecting a power supply from the effects of a recurring overload.

It is a further object of this invention to provide an automatic overload protection system for the high voltage power supply of a television receiver.

It is another object of this invention to provide a power supply protection system that automatically monitors the condition of load after a predetermined time following shut-down, and turns on the power supply if the overload has been removed.

A still further object of this invention is to provide a power supply protection circuit that maintains the power supply in its off state in the event of a continuing overload.

Still another object of the invention is to provide an improved power supply protection system that does not need to be reset manually following a transient overload.

In accordance with a preferred embodiment of the invention, a silicon controlled rectifier is employed in conjunction with a switching mode power supply of the type employing an oscillator to provide oscillations which are subsequently amplified and transformed to a predetermined level through the use of a transformer. A sensing circuit is coupled to the transformer for triggering the silicon controlled rectifier when the current flowing in the transformer exceeds a predetermined amount. The silicon controlled rectifier diverts current from the oscillator, thereby shutting down the power supply. The amount of current diverted through the silicon controlled rectifier is chosen to be slightly above the holding current of the silicon controlled rectifier, thereby preventing the silicon controlled rectifier from permanently latching and allowing the silicon controlled rectifier to be turned off by lowering the impedance between its gate and cathode electrodes.

A timing circuit is employed to turn off the silicon controlled rectifier after a predetermined time duration following the overload, and allow the power supply to be turned on at a controlled rate. If the overload is transient, such as an arc in the cathode ray tube, the operation of the power supply returns to normal. If the overload persists, as in the case of a short circuit, the power supply is turned off, and remains off until it is manually or otherwise reset.

DESCRIPTION OF THE DRAWING

The single FIGURE is a combined schematic and block diagram showing the protection circuit according to the invention employed to protect a switching mode power supply.

DETAILED DESCRIPTION

The FIGURE shows an embodiment of the dual mode overload protection circuit employed to protect a switching mode power supply used in a television receiver. An oscillator 10, an amplifier/driver transistor 12, a transformer 15 and a rectifier 19 comprise a typical solid state power supply used to energize various circuits in a television receiver, including the cathode ray tube. Oscillator 10 is connected through a resistor 20 to the power supply A+ and receives direct current from power supply A+ to power the oscillator. Oscillator 10 provides alternating current oscillations, which in this embodiment occur at the horizontal picture scanning frequency. Oscillator 10 is connected to amplifier/driver transistor 12 and supplies oscillations thereto. The collector 12c of amplifier/driver transistor 12 is connected to a primary winding 16 of transformer 15, also having secondary windings 17 and 18. Transformer 15 is used to transform the oscillations applied to primary 16 by transistor 12 to a predetermined voltage level sufficient to energize other receiver circuitry. The rectifier 19 is connected to one end of secondary 17 and is used to rectify the voltage appearing across secondary 17 to provide the direct current voltage required by the receiver. Although only a single secondary 17 and rectifier 19 for powering the receiver are shown, it should be noted that any number necessary to provide the voltages required by the receiver may be used.

Resistor 20, which supplies power to oscillator 10 is also connected to one terminal of each of capacitor 22, a zener diode 24 and a capacitor 26. The other terminal of capacitor 22 and zener diode 24 are connected to a common, or ground potential. A resistor 28 is connected between ground and the other terminal of capacitor 26. Zener diode 24 provides a substantially constant reference voltage to operate oscillator 10. Capacitors 22 and 26 are filter capacitors and serve to prevent extraneous signals from adversely affecting the operation of oscillator 10. The function of resistor 28 will be explained later in this specification.

The protection circuit, generally designated as 60, according to the invention, for the above described power supply, comprises a thyristor, in this case a silicon controlled rectifier 30, transistors 32, 34 and 36, a diode 38, a zener diode 29, a current sensing resistor 40 and associated passive components connected to the above-mentioned components. Sensing resistor 40 is connected in a series circuit with primary 16 and transistor 12. The anode of diode 38 is connected to resistor 40. The cathode of diode 38 is connected through a resistor 46 to base 36b of transistor 36. A capacitor 44 is connected between the cathode of diode 38 and ground. Collector 36c of transistor 36 is connected through a resistor 48 to the power supply A+ and to base 34b of transistor 34. Collector 34c of transistor 34 is connected to a rectification and filtering circuit comprising resistors 33 and 35, a capacitor 37 and a diode 39, which is connected to secondary 18 of transformer 15. Emitter 34a of transistor 34 is connected to a resistor 31 which provides an emitter load for transistor 34 and to base 32b of transistor 32. Collector 32c of transistor 32 is connected to gate electrode 30g of silicon controlled rectifier 30. The anode electrode 30a of silicon controlled rectifier 30 is connected to resistor 20, capacitors 22, 26 and zener diode 24. The cathode electrode 30c of silicon controlled rectifier 30 is connected to ground. A resistor 42 is connected between the junction of gate 30g and collector 32c and the anode of zener diode 29. The cathode of zener diode 29 is connected to sensing resistor 40. A resistor 50 is connected between gate 30g and ground, and emitters 32a and 36a of transistors 32 and 36, respectively, are connected to ground to complete the circuit.

In operation, a voltage proportional to the current flowing through primary 16 is developed across current sensing resistor 40. In the event of an overload in the secondary circuit of transformer 15, the current in primary 16 will rise, causing the voltage across resistor 40 to increase sufficiently to break down zener diode 29 and turn on silicon controlled rectifier 30. As silicon controlled rectifier 30 turns on, the voltage at its anode 30a is substantially reduced to a value approaching ground potential. Capacitors 22 and 26 are discharged through silicon controlled rectifier 30, with resistor 28 serving to limit the discharge current of capacitor 26 to a value below the maximum current capacity of silicon controlled rectifier 30. Resistor 28 also allows the anode 30a of silicon controlled rectifier 30 to be rapidly brought to a value approaching ground potential when silicon controlled rectifier 30 becomes conductive by allowing the voltage at capacitor 26 to appear across resistor 28 rather than across silicon controlled rectifier 30. This action allows the anode 30a of silicon controlled rectifier 30 to be brought rapidly to a value approaching ground, or zero, potential without requiring that capacitor 26 be completely discharged, thereby rapidly diverting current from oscillator 10, and assuring substantially immediate turn-off of the oscillator to rapidly shut down the power supply. The time required to shut down the power supply is thus substantially equal to the turn on time of silicon controlled rectifier 30. The turn on time of a silicon controlled rectifier is on the order of one microsecond, which is sufficiently fast to prevent damage to the power supply.

In order to better understand the operation of the circuit, a brief description of the operation of a silicon controlled rectifier follows. A silicon controlled rectifier is a four-layer diode having four adjacent layers of oppositely conductive type semiconductor material, such as, for example, P-N-P-N. The anode of the silicon controlled rectifier is normally connected to the first P-type layer, while the cathode is connected to the last N-type layer. The gate, or control electrode, is normally connected to the P-type layer adjacent to the cathode. The four-layer structure is normally non-conductive, and becomes conductive upon application of a cathode to anode potential sufficient to produce avalanche effects, or upon the application of a gate signal sufficient to forward bias the gate to cathode junction of the device and provide a predetermined current flow therethrough. The four-layer structure is inherently regenerative, and if the external circuit connected between the cathode and anode of the silicon controlled rectifier provides current significantly greater than a predetermined minimum value known as the holding current, the silicon controlled rectifier will remain conductive regardless of any subsequent signals applied to the gate. If the current flowing between the cathode and anode electrodes of the silicon controlled rectifier is below the holding current, the silicon controlled rectifier will revert to its non-conductive state upon removal of the forward biasing gate signal. For values of anode to cathode current slightly above the holding current, the silicon controlled rectifier will remain conductive upon removal of the gate turn on signal, but the device may be turned off by reducing the impedance between the gate and cathode electrodes. The aforementioned characteristics occur not only in silicon controlled rectifiers, but in other four-layer devices, also known as thyristors, and it should be noted that any thyristor having these characteristics may be used in place of silicon controlled rectifier 30 according to the invention.

The current supplied to silicon controlled rectifier 30 from the power supply A+ through resistor 20, after capacitors 22 and 26 have been completely discharged, is slightly above the holding current of silicon controlled rectifier 30, thereby making the conductivity of controlled rectifier 30 responsive to the impedance between gate 30g and cathode 30c. In this embodiment, controlled rectifier 30 has a maximum continuous current rating of 850 milliamperes, and normally diverts approximately 10–15 milliamperes from the power supply A+ through resistor 20. This value is slightly above the holding current of approximately 5 milliamperes for this particular silicon controlled rectifier, but below the approximately 60 milliamperes of anode to cathode current required to make the device non-responsive to gate to cathode impedance changes.

After silicon controlled rectifier 30 has been rendered conductive by the voltage applied to gate 30g as a result of current flowing through resistor 40, the power supply is shut down thereby reducing the voltage across resistor 40 to substantially zero, which in turn reduces the voltage applied to gate 30g to substantially zero. However, since the current flowing between the anode and cathode of silicon controlled rectifier 30 is in the range of currents slightly above the holding current, controlled rectifier 30 remains conductive.

Prior to shutdown, the voltage appearing across resistor 40 as a result of the overload was coupled to capacitor 44 through diode 38, charging capacitor 44 to a positive voltage. The positive voltage across capacitor 44 forward biases the base 36b of transistor 36, thereby saturating transistor 36, and reduces the voltage at collector 36c of transistor 36 substantially to zero. The low voltage at collector 36c, when transistor 36 is saturated, is insufficient to forward bias base 34b of transistor 34, and transistor 34 remains non-conductive. Since transistor 34 is non-conductive, the voltage at emitter 34a is at substantially ground potential. This voltage is insufficient to forward bias the base-emitter junction of transistor 32, and transistor 32 also remains non-conductive. When transistor 32 is in its non-conductive state, the impedance between collector 32c and emitter 32a is relatively high compared to the resistance of resistor 50, which in this case is approximately 500 ohms, and the impedance between gate 30g and cathode 30c of silicon controlled rectifier 30 is approximately equal to the resistance of resistor 50.

Following shutdown, capacitor 44 discharges through resistor 46 and the base to emitter junction of transistor 36. After a length of time determined by the values of capacitor 44 and resistor 46 (about 4 milliseconds in this embodiment), capacitor 44 discharges to a level insufficient to maintain saturation of transistor 36. As transistor 36 begins to turn off, voltage is applied to base 34b from the power supply A+ through resistor 48, causing transistor 34 to become conductive. When transistor 34 becomes conductive, the voltage at emitter 34a rises, thereby forward biasing the base to emitter junction of transistor 32 and causing transistor 32 to saturate. As transistor 32 saturates, the impedance between collector 32c and emitter 32a is reduced, and drops substantially below the value of the resistance of resistor 50. This substantially reduces the impedance between gate 30g and cathode 30c of silicon controlled rectifier 30, and allows silicon controlled rectifier 30 to return to its non-conductive state.

After silicon controlled rectifier 30 has returned to its non-conductive state, capacitors 22 and 26 are charged from the power supply A+ through resistor 20. Capacitors 22, 26 and resistor 20 limit the rate of increase of power supply voltage to oscillator 10, thereby allowing the oscillations from oscillator 10 to build up at a controlled rate. The time required for the oscillations to build up may range from several milliseconds to approximately 1 second, depending on the type of power supply and load used. The controlled oscillations are applied to amplifier/driver transistor 12, which in turn applies an alternating current signal having a controlled build-up to transformer 15. The controlled build-up of the signal applied to transformer 15 controls the rate of build-up of the output voltage of the power supply and prevents reactive loads, such as, for example, filter capacitors attached to the power supply, from drawing excessive current during turn on. This protects the power supply from being damaged by excessive current and prevents false triggering of the protection circuitry.

If the fault, or overload, which cause the initial shutdown was a transient overload, such as, for example, arcing in the cathode ray tube, only nominal voltage will appear across resistor 40 after silicon controlled rectifier 30 is turned off, and normal operation of the power supply will resume. If the overload is the result of a permanent fault, such as, for example, a short circuit, the voltage across resistor 40 will increase as the signal applied to transformer 15 from amplifier/driver transistor 12 increases. The increased voltage across resistor 40 will break down zener diode 29 and cause silicon controlled rectifier 30 to become conductive to again shut down the power supply.

Following the second shutdown, however, the power supply will not automatically turn on again. This is achieved by proper selection of the time constants of the filtering circuit comprising resistors 33, 35 and capacitor 37. Capacitor 37 is charged from secondary 18 and diode 39 through resistor 33. Resistors 33 and 35 limit the rate at which capacitor 37 is charged, and in this embodiment, the charging time constant of capacitor 37 is approximately 1 second. In the event of a fault, capacitor 37 maintains its charge for a sufficient time to allow transistor 32 to be turned on when transistor 34 becomes conductive. Capacitor 37 is then rapidly discharged (in about 0.5 milliseconds in this embodiment) through transistor 34 and the base to emitter junction of transistor 32. During this time, capacitor 37 supplies the necessary current to saturate transistor 32, which in turn renders silicon controlled rectifier 30 non-conductive.

For transient overloads, such as arcing in the picture tube, the power supply returns to normal operation, and capacitor 37 is charged by the voltage appearing at secondary 18. This returns the protection circuit to its cyclic mode, thereby assuring automatic turn on in the event of another transient overload. If the overload condition persists, as in the case of a short circuit, the voltage across sensing resistor 40 will cause silicon controlled rectifier 30 to become conductive to shut down the power supply before capacitor 37 has charged through resistor 33. In this event, there will be no voltage available at the collector 34c of transistor 34 to cause transistor 32 to turn on when transistor 34 becomes conductive. Hence, the power supply will remain permanently shut off in the event of a continuing overload.

In this embodiment, the voltage for charging capacitor 37 is obtained from secondary 18 of transformer 15, however, this voltage may be obtained from any point in the television receiver whose voltage drops when the power supply is turned off.

It should be noted that if the permanent turn off feature is not required, as in the case of some low current, low voltage, power supplies, transistor 34 and its associated circuitry may be eliminated, and the base 32b of transistor 32 may be connected to the collector 36c of transistor 36. In this embodiment, the rapid turn off with controlled buildup feature and the automatic reset feature will be retained.

I claim:

1. A protection system for a power supply for removing power from a load during an overload, including in combination, means for sensing current delivered to said load, a controlled rectifier having gate, cathode and anode electrodes, said cathode and anode electrodes being connected to said power supply and diverting current therefrom upon conduction of said controlled rectifier said gate electrode being coupled to said sensing means and responsive thereto for rendering said controlled rectifier conductive when said current exceeds a predetermined level, variable impedance means connected to said gate and cathode electrodes for reducing the value of impedance therebetween to render said controlled rectifier non-conductive, and means connected in circuit with said controlled rectifier for limiting the current therethrough to a predetermined level for maintaining said controlled rectifier responsive to said variable impedance means.

2. A protection system as recited in claim 1 further including a timing circuit comprising a resistor and a capacitor, said timing means being connected to said variable impedance means and to said sensing means for causing said variable impedance means to reduce the value of the impedance between said gate and cathode electrodes after said controlled rectifier has been conductive a predetermined period of time.

3. A protection system as recited in claim 2 further including capacitor means, said capacitor means being connected to said power supply for receiving charge therefrom, and to said variable impedance means for providing power thereto for maintaining said variable impedance means responsive to said timing circuit for rendering said controlled rectifier non-conductive a predetermined number of successive times.

4. In a switching mode power supply operating from a source of direct current potential and utilizing an oscillator and a transformer, an overload protection system comprising; sensing means connected in circuit with said transformer for sensing output current delivered by said power supply and providing a sensing signal in response thereto, a controlled rectifier connected to divert current from said oscillator, said controlled rectifier having cathode, anode and gate electrodes, means coupled to said sensing means and to the gate electrode of said controlled rectifier for rendering said controlled rectifier conductive in response to the sensing signal from said sensing means when the output current exceeds a predetermined value to cause said controlled rectifier to divert direct current from said oscillator through said cathode and anode electrodes, thereby rendering said oscillator and said power supply substantially inoperative, means connected to one of said cathode and anode electrodes for limiting said diverted current to a predetermined level less than the current required to cause said controlled rectifier to become nonresponsive to said gate electrode, and variable impedance means connected to said gate and cathode electrodes for providing a low impedance path therebetween for rendering said controlled rectifier non-conductive.

5. A system as recited in claim 4 further including a timing circuit connected to said variable impedance means, said variable impedance means being responsive to said timing circuit to provide said low impedance path between said gate and cathode electrodes for rendering said controlled rectifier non-conductive after a predetermined time duration following said controlled rectifier being rendered conductive.

6. A system as recited in claim 5 further including capacitor means connected to said power supply for receiving charge therefrom and to said variable impedance means for making said variable impedance means responsive to said timing circuit for rendering said controlled rectifier non-conductive a predetermined number of successive times.

7. A system as recited in claim 9 wherein said predetermined number is one.

8. A system as recited in claim 5 wherein said timing circuit includes a resistor and a capacitor, and a diode connected to said capacitor and to said sensing means for receiving current therefrom for charging said capacitor.

9. A system as recited in claim 5 further including resistance-capacitance means for controlling the rate of build up and decay of voltage applied from said source of direct current potential to said oscillator, said resistance-capacitance means being connected to the cathode and anode electrodes of said controlled rectifier, said oscillator, and said source of direct current potential, said resistance-capacitance means including a series connected resistor and capacitor connected across said cathode and anode electrodes for determining said rate.

10. A system as recited in claim 8 wherein said coupling means includes a zener diode.

11. A protection system as recited in claim 1 wherein said variable impedance means includes a transistor having emitter and collector electrodes, one of said emitter and collector electrodes being connected to said gate electrode and the other of said emitter and collector electrodes being connected to said cathode electrode for providing a low impedance between said gate and cathode electrodes when said transistor is rendered conductive.

12. A power supply protection system as recited in claim 11 wherein said current limiting means includes a resistor.

* * * * *